United States Patent Office 3,302,498
Patented Feb. 7, 1967

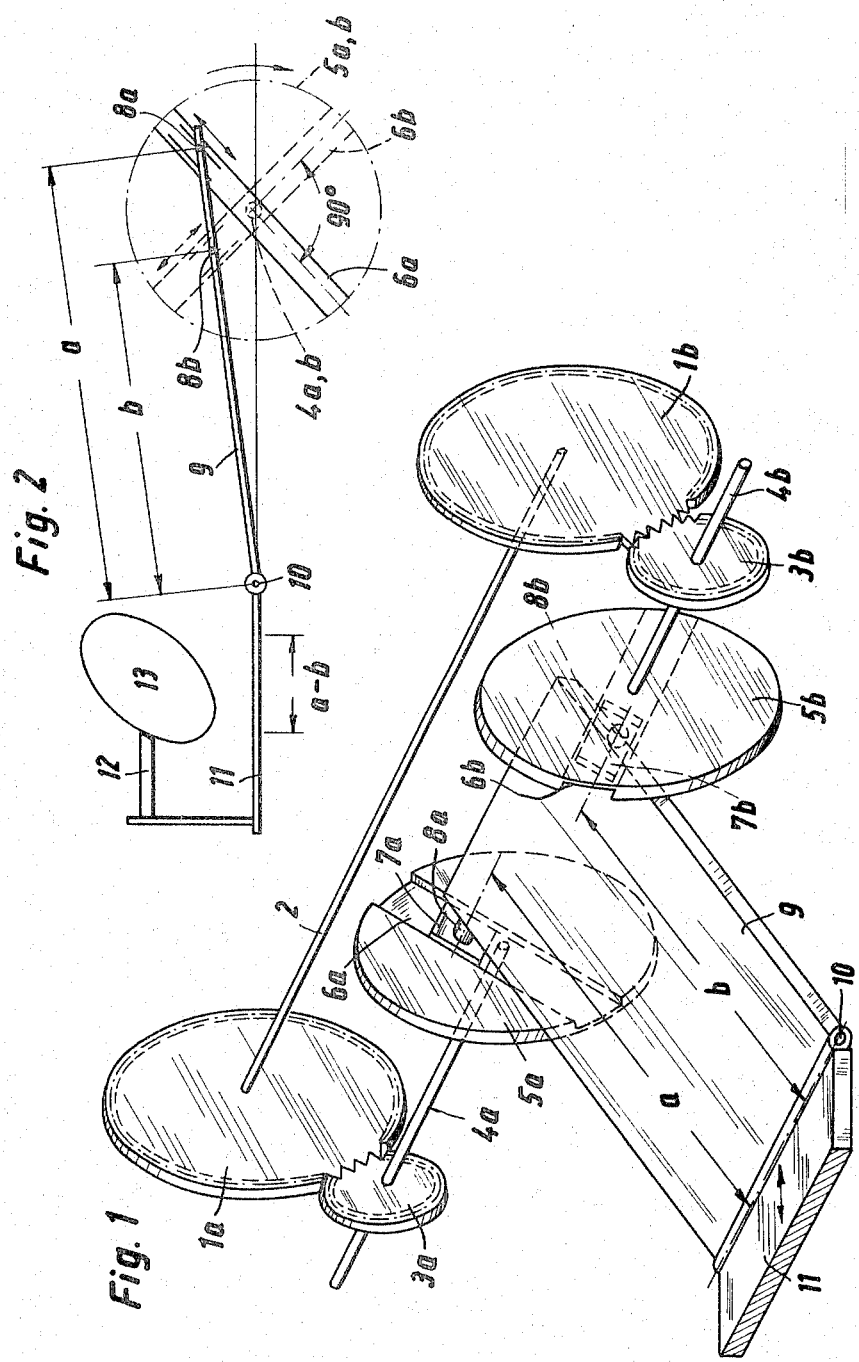

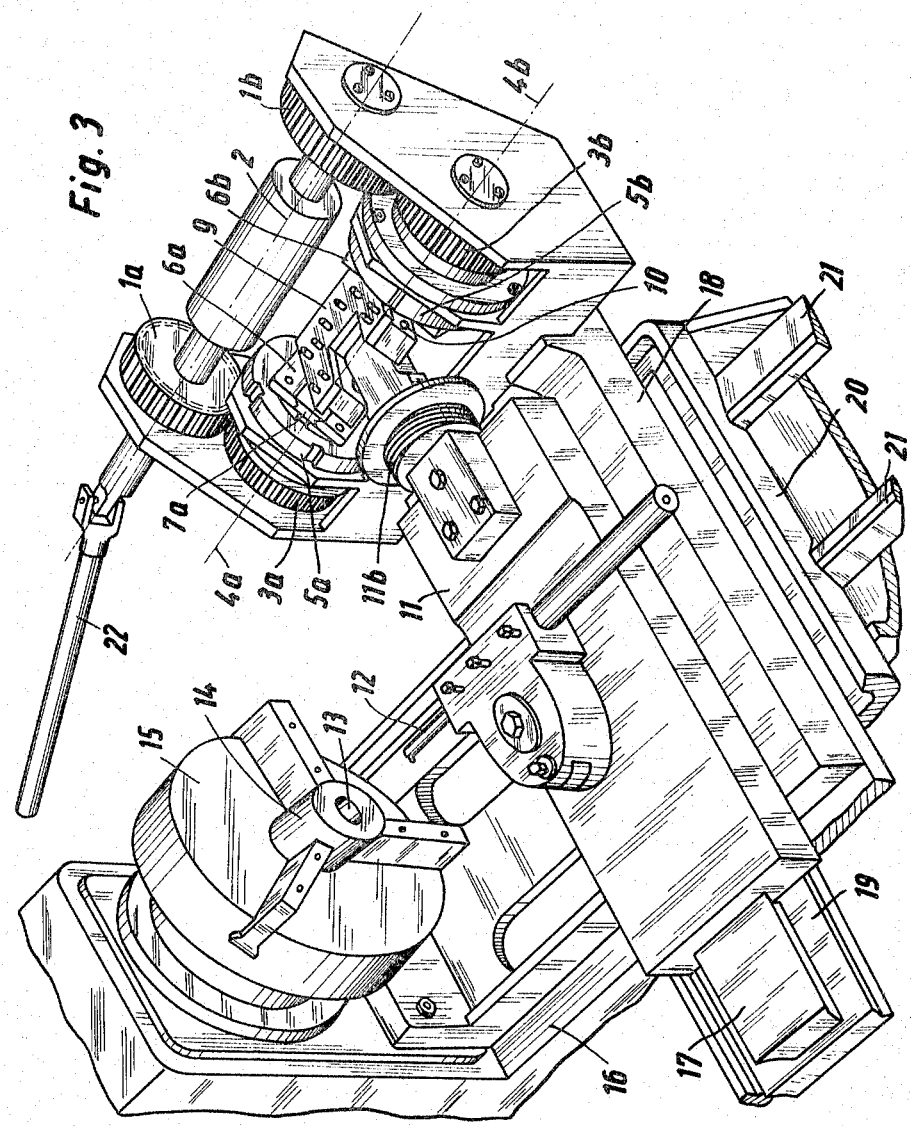

3,302,498
APPARATUS FOR MACHINING NON-CIRCULAR PROFILES
Georg Spinner, Erzgiessereistr. 33, Munich, Germany
Filed Aug. 12, 1964, Ser. No. 389,150
Claims priority, application Germany, Aug. 23, 1963,
S 86,877
8 Claims. (Cl. 82—18)

This invention relates to an apparatus for making elliptical profiles by machining on machine tools, particularly lathes.

It is a main object of the invention to make noncircular and particularly elliptical profiles without requiring the use of templates or patterns, such as are usual in the conventional copying machines.

It is another object of the invention to provide a simple, positive control linkage between the workpiece and the tool, which control linkage enables the making of elliptical or ellipsoidal profiles on a normal lathe or another machine tool, for instance, a grinding machine.

It is a further object of the invention to design such an additional apparatus in such a manner that it can be subsequently attached to a machine tool of the above mentioned type without substantial expenditure.

A further object of the invention resides in designing such an apparatus consisting of a few, simple components in such a manner that the apparatus can be made at low cost and with a small labor expenditure.

Still another object of the invention resides in the provision of an apparatus of the above-mentioned type, which is particularly suitable for the manufacture of fittings for hollow conductors having an elliptical or ellipsoidal cross-section and used in high frequency engineering.

It is another object of the invention to make profiles having a plurality of axes of symmetry, such as rounded polygons.

A further object of the invention is to make eccentric profiles.

Further advantages and details of the invention will become apparent from the following description of illustrative embodiments with reference to the drawing, in which FIG. 1 is a diagrammatic elevation showing an elliptical turning attachment according to the invention, FIG. 2 is a diagrammatic representation of the cycle of operations, and FIG. 3 is a perspective view showing a portion of a lathe provided with the elliptical turning attachment according to the invention for periodically extending and retracting the cross slide rest.

FIGS. 4 to 7 show various profiles which can be made with the apparatus according to the invention.

A shaft 2 rotates in synchronism with the headstock spindle and carries two identical gears 1a and 1b. These gears are in mesh with gears 3a and 3b, respectively, which are fixedly secured to shafts 4a and 4b, respectively. The transmission arrangement is such that the shafts 4a and 4b have the same speed as the headstock spindle.

The shafts 4a and 4b extend parallel to the headstock spindle and carry discs 5a and 5b, each of which is provided with a parallel guide 6a or 6b. The axis of the parallel guide 6b in the disc 5b is at an angle of 90° to the axis of the parallel guide 6a of the disc 5a (FIG. 2). Slide blocks 7a and 7b are slidably mounted in the parallel guides 6a and 6b, respectively, and are pivoted by pins 8a and 8b, respectively to a link 9. a is the distance between the pin 8a and the pivot 10 movably connecting the link 9 to the cross slide rest 11 of the lathe. b is the distance from the pivot 10 to the pivot pin 8b of the slide block 7b. In the example shown, b is smaller than a.

FIG. 2 is a diagrammatic view showing the elliptical turning attachment viewed in the axial direction of the headstock spindle. The link 9 is connected by the pivot pin 10 to the cross slide rest 11, which carries the tool 12 for machining the tool 13, which is gripped in the chuck 14, 15 of the lathe (FIG. 3).

In response to a rotation of the discs 5a and 5b, the slide blocks sliding in the parallel guides positively control the link 9 so that it performs a periodic reciprocation in the transverse direction. The amplitude of this oscillation is a a—b. As a result, the difference between the largest and smallest radii of the elliptically turned workpiece 13 equals the difference a—b. The eccentricity of the turned elliptical profile depends also on the absolute value of the largest diameter of the turned workpiece.

The pivot pins 8a and 8b are so mounted in longitudinal guides of the link 9 that the distance a and the distance b can be varied. An adjustment of the pivot pins 8a and 8b on the link 9 to the desired distance from the axis enables the adjustment of any desired absolute values of a and b and of any desired difference a—b.

Hence, the apparatus according to the invention enables the shaping of profiles having the geometric configuration of an ellipse. The distances a and b correspond to the major and minor radii, respectively, of the ellipse of the profile to be turned.

A proper selection of a and b relative to the dimensions of the profile to be turned enables the making of oval profiles or of other profiles which are similar to an ellipse and are required particularly in microwave engineering, e.g., in the manufacture of fittings of hollow conductors.

FIG. 3 of the drawing illustrates an embodiment of the invention attached to a lathe, which is only partly shown. A link 11a is pivotally connected to the cross slide rest 11 and to the pivot 10. The cross slide rest has a screw-threaded adjusting device 11b, which can be increased and reduced in length. The cross slide rest slides on a dovetail guide 17 of a support 19, which carries an intermediate support, which has secured to it the transmission for effecting the periodic extension and retraction. The support 19 is carried by the longitudinal slide rest 20, which is movable on guide rails 21.

A universal joint shaft 22 is connected by a transmission to the spindle drive means so that the shafts 4a and 4b rotate at the same speed as the spindle, when it is desired to make elliptic profiles. During the making of ellipses, the slide rest is extended and retracted twice during each revolution of the spindle.

Non-circular profiles having a plurality of axes of symmetry can be made by a change of the transmission ratio between the headstock spindle and the shaft 4a, 4b. This change may be effected, e.g., by a step change transmission between the headstock spindle and the universal joint shaft 22.

Eccentric profiles will be obtained if the speed of the shaft 4a, 4b is lower than that of the headstock spindle.

If the speed of the shaft 4a, 4b is higher than that of the headstock spindle, polygonal profiles will be obtained, in which the number of (rounded) corners equals 2n, 1:n being the transmission ratio between the headstock spindle and the shaft 4a, 4b.

FIG. 4 shows a cardioid profile which can be obtained with a 1:1 transmission ratio if the adjusted turning diameter is smaller than the size of the ellipse.

FIG. 5 shows a profile which is similar to a triangle and obtained at a transmission ratio of 1:1.5. The profile of FIG. 6 can be obtained with transmission ratio of 1:2, that of FIG. 7 with a transmission ratio of 1:3.

Figure 4:
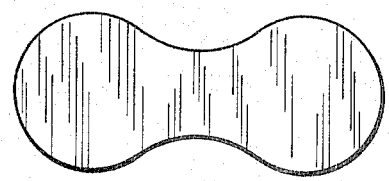
FIGS. 4 to 6 show only some of a plurality of profiles which can be made with the apparatus according to the invention.
Figure 5:
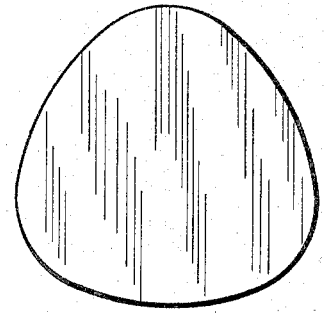
Figure 6:
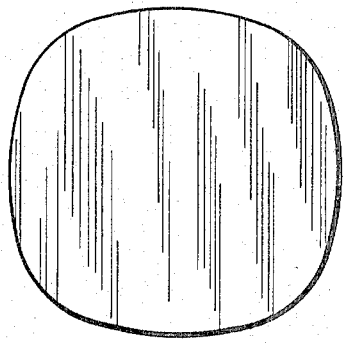
Figure 7:
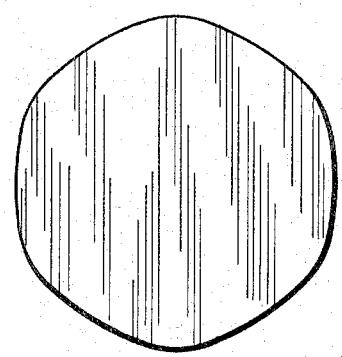

What I claim is:

1. A machine tool comprising a rotatable spindle, workpiece gripping means carried by said rotatable spindle, drive means for rotating said rotatable spindle, a cross slide rest, a machining tool mounted on the cross slide rest, and a control apparatus for transversely displacing said cross slide rest, said control apparatus comprising a transmission, said transmission having an output connected to said cross slide rest and an input, means for coupling said input to said drive means, said transmission being designed to effect a periodic extension and retraction movement of the cross slide rest in response to a constant input speed so that the tool which engages the workpiece performs a substantially non-circular motion relative to the workpieces said transmission further comprising a link which is pivoted at one end to said cross slide rest, an output shaft rotating at a constant speed, two members mounted on said output shaft for rotation therewith, each of said members being provided with a guide, each of said guides having a slide block slidably mounted therein, said guides extending substantially at right angles to each other, two pivot pins spaced in the longitudinal direction of said link, each of said pivot pins being arranged to pivotally connect said link to one of said slide blocks.

2. A machine tool as set forth in claim 1, in which said pivot pins are mounted on said link to be individually slidably adjustable in the longitudinal direction of said link, and means for fixing said pivot pins in their adjusted position.

3. A machine tool as set forth in claim 1, in which said output shaft rotates at the speed of the spindle so that elliptical and ellipsoidal profiles are obtained.

4. A machine tool as set forth in claim 1, in which said output shaft has a higher speed than the spindle so that non-circular profiles having a plurality of axes of symmetry are obtained.

5. A machine tool as set forth in claim 1, in which said output shaft has a lower speed than said spindle so that eccentric profiles are obtained.

6. A machine tool as set forth in claim 1, in which a step change transmission is connected between said rotatable spindle and said output shaft.

7. A machine tool as set forth in claim 1, in which said control apparatus further comprises a rotator for said members, said rotator comprising first gears, a first shaft, second gears and said output shaft, said first gears being mounted on said first shaft and said second gears being mounted on said output shaft, said first gears being operatively engaged with said second gears, to rotate said second gears, said first shaft being connectable to a means for rotating said first shaft, said link being pivotally connected directly to said cross-slide rest.

8. A machine tool as set forth in claim 1, in which said pivot pins are disposed on opposite sides of said link.

References Cited by the Examiner

UNITED STATES PATENTS

| 403,120 | 5/1889 | Maloy | 82—18 |
| 531,203 | 12/1894 | MacCord | 82—18 |
| 675,469 | 6/1901 | Derrer | 82—18 |
| 701,217 | 5/1902 | Montreiul | 82—18 |
| 1,931,157 | 10/1933 | Bickel | 82—18 |

WILLIAM W. DYER, Jr., *Primary Examiner.*

LEONIDAS VLACHOS, *Examiner.*